US008750099B2

(12) United States Patent
Patel et al.

(10) Patent No.: US 8,750,099 B2
(45) Date of Patent: Jun. 10, 2014

(54) METHOD FOR PROVIDING BORDER GATEWAY PROTOCOL FAST CONVERGENCE ON AUTONOMOUS SYSTEM BORDER ROUTERS

(75) Inventors: Keyur Patel, San Jose, CA (US); Robert Raszuk, Warsaw (PL)

(73) Assignee: Cisco Technology, Inc., San Jose, CA (US)

( * ) Notice: Subject to any disclaimer, the term of this patent is extended or adjusted under 35 U.S.C. 154(b) by 115 days.

(21) Appl. No.: 13/329,113

(22) Filed: Dec. 16, 2011

(65) Prior Publication Data

US 2013/0155845 A1 Jun. 20, 2013

(51) Int. Cl.
*H04L 12/26* (2006.01)

(52) U.S. Cl.
USPC ............................. 370/225; 370/409; 370/410

(58) Field of Classification Search
None
See application file for complete search history.

(56) References Cited

U.S. PATENT DOCUMENTS

| | | | |
|---|---|---|---|
| 2006/0133265 A1* | 6/2006 | Lee | 370/228 |
| 2006/0133390 A1* | 6/2006 | Sreekantiah et al. | 370/401 |
| 2006/0245374 A1* | 11/2006 | Patel et al. | 370/254 |
| 2007/0091793 A1* | 4/2007 | Filsfils et al. | 370/228 |
| 2007/0091795 A1* | 4/2007 | Bonaventure et al. | 370/228 |
| 2007/0214280 A1* | 9/2007 | Patel et al. | 709/239 |
| 2008/0215880 A1* | 9/2008 | Guichard et al. | 713/162 |
| 2010/0061230 A1* | 3/2010 | Xiong et al. | 370/225 |
| 2010/0080222 A1* | 4/2010 | Mohapatra et al. | 370/392 |
| 2010/0142370 A1* | 6/2010 | Pan et al. | 370/228 |
| 2010/0150020 A1* | 6/2010 | Rosen et al. | 370/254 |
| 2013/0176845 A1* | 7/2013 | Olofsson et al. | 370/225 |

\* cited by examiner

*Primary Examiner* — Ian N. Moore
*Assistant Examiner* — Eric P Smith
(74) *Attorney, Agent, or Firm* — Hickman Palermo Truong Becker Bingham Wong LLP

(57) ABSTRACT

Techniques are disclosed for providing fast convergence on Autonomous System Border Routers (ASBRs). In an embodiment, an ASBR receives first Virtual Private Network (VPN) route information including a first route target, a first route distinguisher, and a first network prefix and second VPN route information including a second route target, a second route distinguisher and a second network prefix. The second route distinguisher received by the ASBR is different than the first route distinguisher. The ASBR compares the first route target to the second route target and the first network prefix with the second network prefix. In response to determining that the first route target matches the second route target and the first network prefix matches the second network prefix, the ASBR associates, in a routing table, a first path based on the first VPN route information with a second path based on the second VPN route information.

20 Claims, 5 Drawing Sheets

METHOD FOR PROVIDING BORDER GATEWAY PROTOCOL FAST CONVERGENCE ON AUTONOMOUS SYSTEM BORDER ROUTERS

TECHNICAL FIELD

The present disclosure generally relates to communicating network routing information using the Border Gateway Protocol (BGP). The disclosure relates more specifically to detecting backup paths to sites within a Virtual Private Network (VPN).

BACKGROUND

The approaches described in this section could be pursued, but are not necessarily approaches that have been previously conceived or pursued. Therefore, unless otherwise indicated herein, the approaches described herein are not admitted to be prior art by inclusion in this section.

In current Virtual Private Network (VPN) deployments, such as described in Request for Comments (RFC) 4364 and RFC 2547 of the Internet Engineering Task Force (IETF), one model of connecting Autonomous Systems (ASes) is referred to as Inter-AS Option B. According to this model, Border Gateway Protocol (BGP) is used to exchange VPN route information, such as VPN labels and prefixes, between Autonomous System Border Routers (ASBRs). In a typical implementation, provider edge (PE) routers assign Multiprotocol Label Switching (MPLS) labels for routes to customer VPN sites and distribute the labeled VPN routes using internal BGP (IBGP) to the ASBR. The ASBR then uses external BGP (EBGP) to implement next-hop self by replacing the labels of the VPN routes with a locally allocated label and distribute the newly labeled VPN routes to ASBRs in other ASes. During this process, the ASBRs do not maintain correlations between VPN routes and the VPN sites that these routes service.

DESCRIPTION OF EXAMPLE EMBODIMENTS

Figure 1:
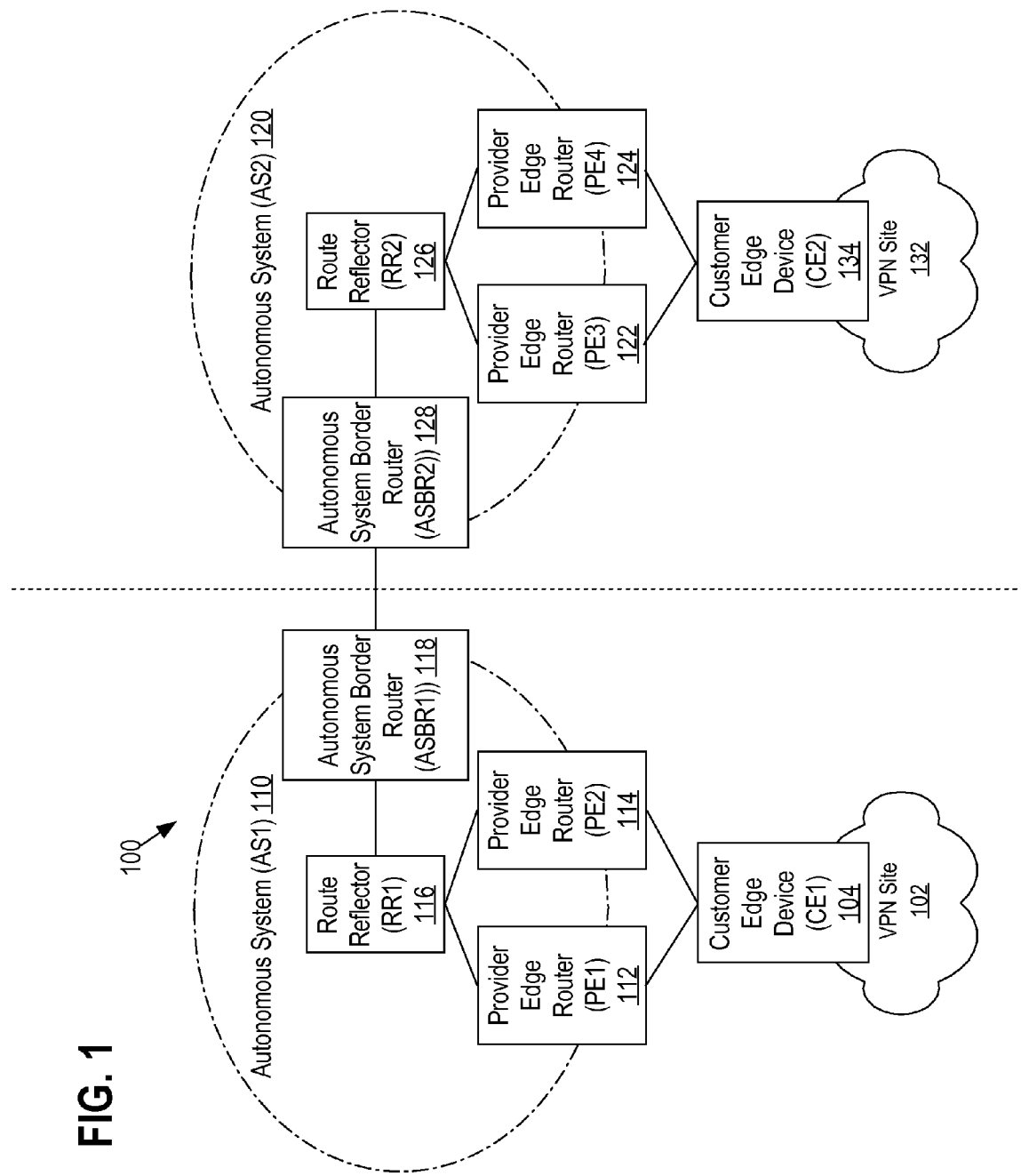
FIG. 1 illustrates an example Virtual Private Network (VPN) connecting two autonomous systems (ASes) that include multihomed VPN sites in accordance with an embodiment.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 Overview
 2.0 Structural and Functional Overview
 3.0 Detecting Multihomed Prefixes and Computing Backup Paths
  3.1 Fully-Automated Approach
  3.2 Semi-Automated Approach
 4.0 Implementation Mechanisms—Hardware Overview
 5.0 Extensions and Alternatives 1.0 Overview Techniques are disclosed for providing fast convergence on Autonomous System Border Routers (ASBRs). In an embodiment, an ASBR receives first Virtual Private Network (VPN) route information including a first route target, a first route distinguisher, and a first network prefix and second VPN route information including a second route target, a second route distinguisher and a second network prefix. In an embodiment, the second route distinguisher received by the ASBR is different than the first route distinguisher. The ASBR compares the first route target to the second route target and the first network prefix with the second network prefix. In response to determining that the first route target matches the second route target and the first network prefix matches the second network prefix, the ASBR associates, in a routing table, a first path based on the first VPN route information with a second path based on the second VPN route information.

In another embodiment, associating the first path with the second path in the routing table includes computing a primary path and a backup path to a VPN site. The primary path traverses a first provider edge (PE) router associated with the first VPN route information and the backup path traverses a second provider edge (PE) router associated with the second VPN route information. Once the primary path and backup path are computed, the ASBR installs the primary path and the backup path in the routing table of the ASBR.

In an embodiment, the ASBR receives a first network packet that is destined for the VPN site. In response to receiving the first network packet, the ASBR forwards the first network packet along the primary path. The ASBR may then receive a second network packet that is destined for the VPN site. The ASBR detects a failure along the primary path and, in response, forwards the second packet along the backup path.

In an embodiment, the ASBR stores mapping data that maps route targets to site identifiers. When the ASBR compares the first route target to the second route target, the ASBR may search the mapping data using the first route target to find a site identifier associated with the first route target. The ASBR may further search the mapping data using the second route target to find a site identifier associated with the second route target. The ASBR determines whether the site identifier associated with the first route target and the site identifier associated with the second route target are the same. If they are the same, then the ASBR determines that the first route target and second route target match.

In another embodiment, the ASBR may determine that the first route target does not match the second route target or the first network prefix does not match the second network prefix. In response to such a determination, the ASBR determines that the first path and the second path are not associated as a primary path and a backup path.

In another embodiment, the routing table is at least one of a Routing Information Base (RIB) or a Forwarding Information Base (FIB).

In another embodiment, the ASBR stores a list of disqualified route targets. The ASBR compares the first route target and the second route target to the list of disqualified route targets. In response to determining that the first route target or the second route target is included on the list of disqualified route targets, the ASBR determines that the first path and the second path are not associated as a primary path and a backup path.

In other embodiments, one or more non-transitory computer-readable storage media store instructions which, when executed by a processor, cause performing one or more of the methods described herein.

2.0 Structural and Functional Overview

According to techniques described herein, ASBRs may be configured to detect VPN prefixes that belong to multihomed sites. A multihomed site is a site for which there are at least two different routes from an ASBR to a VPN site. Based on the VPN prefix detection, the ASBRs may compute backup paths to multihomed sites for fast convergence. In the event of a primary path failure, the ASBR may use a backup path to route network packets to a multihomed site.

FIG. 1 illustrates an example network arrangement for implementing a VPN that crosses multiple Autonomous Systems (ASes). Network arrangement 100 includes AS1 110 and AS2 120. In an embodiment, each AS includes a collection of network prefixes and a set of routers and presents a common interior routing plan to other ASes. Each router in an AS may comprise an ASBR, a provider edge (PE) router, a route reflector (RR), etc. In an embodiment, each router may comprise a computing device that is implemented as described in connection with FIG. 4.

Each AS may be under the control of one or more network operators. For example, a first service provider may manage or otherwise control AS1 110 and a second service provider may manage or otherwise control AS2 120. In example network arrangement 100, AS1 110 includes PE1 112, PE2 114, RR1 116, and ASBR1 118. AS2 120 includes PE3 122, PE4 124, RR2 126, and ASBR2 128. AS1 110 and AS2 120 connect VPN sites 102 and 132, which form a common VPN. VPN site 102 and VPN site 132 may also belong to other VPNs, depending on the implementation.

Each VPN site includes at least one customer edge (CE) device. In example network arrangement 100, VPN site 102 includes CE1 104, and VPN site 132 includes CE2 134. VPN sites 102 and 132 may be customer sites that include, without limitation, one or more network devices that are communicatively coupled via a private network and are associated with one or more private Internet Protocol version 4 (IPv4) or version 6 (IPv6) addresses. The CE devices are configured to peer with one or more PE routers to exchange route information for the VPN sites. In example network arrangement 100, CE1 104 peers with PE1 112 and PE2 114, and CE2 134 peers with PE3 122 and PE4 124. Thus, CE1 104 peers with PE1 112 and PE2 114 to exchange route information for VPN site 102, and CE2 134 peers with PE3 122 and PE4 124 to exchange route information for VPN site 132. Exchanging route information may include, without limitation, the CE advertising a network prefix, such as an IPv4 or IPv6 prefix, that is associated with one or more network devices within the VPN site.

PE routers maintain routing tables termed VPN routing and forwarding tables (VRFs) to store route information received from CE devices. In an embodiment, the VRFs include the routes for directly connected VPN sites. For example, PE1 112 and PE2 114 maintain a VRF for VPN site 102, and PE3 and PE4 maintain a VRF for VPN site 132. If the VPN sites belong to more than one VPN, then the PE routers may maintain a separate VRF for each VPN instance.

In an embodiment, PE routers are configured to assign route targets (RTs) to VPN routes. Route targets may comprise any data that identifies a set of VPN sites and/or a set of VRFs. The manner in which PE router assigns the RT may vary from implementation to implementation. For example, the PE router may be configured to associate all routes that lead to a specified site with a specified RT. Alternatively, the PE router may be configured to associate certain routes leading to a specified site with one RT, and certain routes with another RT.

In an embodiment, PE routers are configured to assign route distinguisher (RD) values to VPN routes. The RD values may comprise any data that allows the PE router to generate distinct routes to a common network prefix. For example, an RD may comprise a value that is appended to a network prefix to create a VPN-IPv4 or VPN-IPv6 prefix. Thus, two different VPN prefixes may be generated that have the same network prefix part, but different RD values.

PE routers may implement any suitable protocol to distribute VPN route information to its peers. Example protocols that may be used include, without limitation internal gateway protocols, such as IBGP. In example network arrangement 100, PE1 112 and PE2 114 distribute the VPN route information to RR1 116, and PE3 122 and PE4 124 distribute the route information to RR2 126. The VPN route information may include, without limitation, the RT, VPN prefixes, MPLS labels, and any other information associated with the VPN routes. In an embodiment, the VPN route information may be distributed via a BGP UPDATE message.

In an embodiment, the ASBRs comprise a communications interface for receiving the VPN route information via the route reflectors. In example network arrangement 100, ASBR1 118 is configured as a client of RR1 116 and ASBR2 128 is configured as a client of RR2 126. Thus, ASBR1 118 receives VPN route information from PE1 112 and PE2 114 through RR1 116, and ASBR2 128 receives VPN route information from PE3 122 and PE4 124 through RR2 126. The ASBRs are further configured to exchange VPN route information with ASBRs in other ASes. For example, ASBR1 118 may send the VPN route information learned via RR1 116 to ASBR2 128. Conversely, ASBR2 128 may send the VPN route information learned via RR2 126 to ASBR1 118. The ASBRs may implement any suitable protocol to exchange the route information with ASBRs in other ASes. Examples include external gateway protocols such as EBGP. The VPN route information maintained by the ASBRs and PE routers is used to determine how to route packets associated with the VPN.

In an embodiment, the ASBRs are configured to detect VPN prefixes associated with multihomed sites. Once detected, the ASBRs may compute a primary path and backup path to the multihomed site and install these paths in a routing table stored locally on the ASBR. The routing table may include a routing information base (RIB) and/or a forwarding information base (FIB), depending on the implementation. Techniques for detecting multihomed VPN prefixes and computing primary and backup paths are described in further detail below.

The network arrangements depicted herein may vary from implementation to implementation, and the particular network arrangement illustrated in FIG. 1 is not required. For example, each AS may include additional CE routers, PE routers, RRs, ASBRs, Provider (P) routers, or other routing and network devices that are not illustrated for purposes of brevity. CE1 104 and/or CE2 132 may also be peered with additional or fewer PE routers than illustrated, depending on the implementation. In alternative embodiments, a full-mesh configuration may be implemented within an ASBR such that the RRs are omitted and the PE routers peer directly with the ASBR. For example, ASBR1 118 may include a communications interface to receive VPN route information directly from PE1 112 and PE2 114 without the need for RR1 116. Examples of complete IBGP mesh configurations are described in RFC 4364.

3.0 Detecting Multihomed Prefixes and Computing Backup Paths

Figure 2:
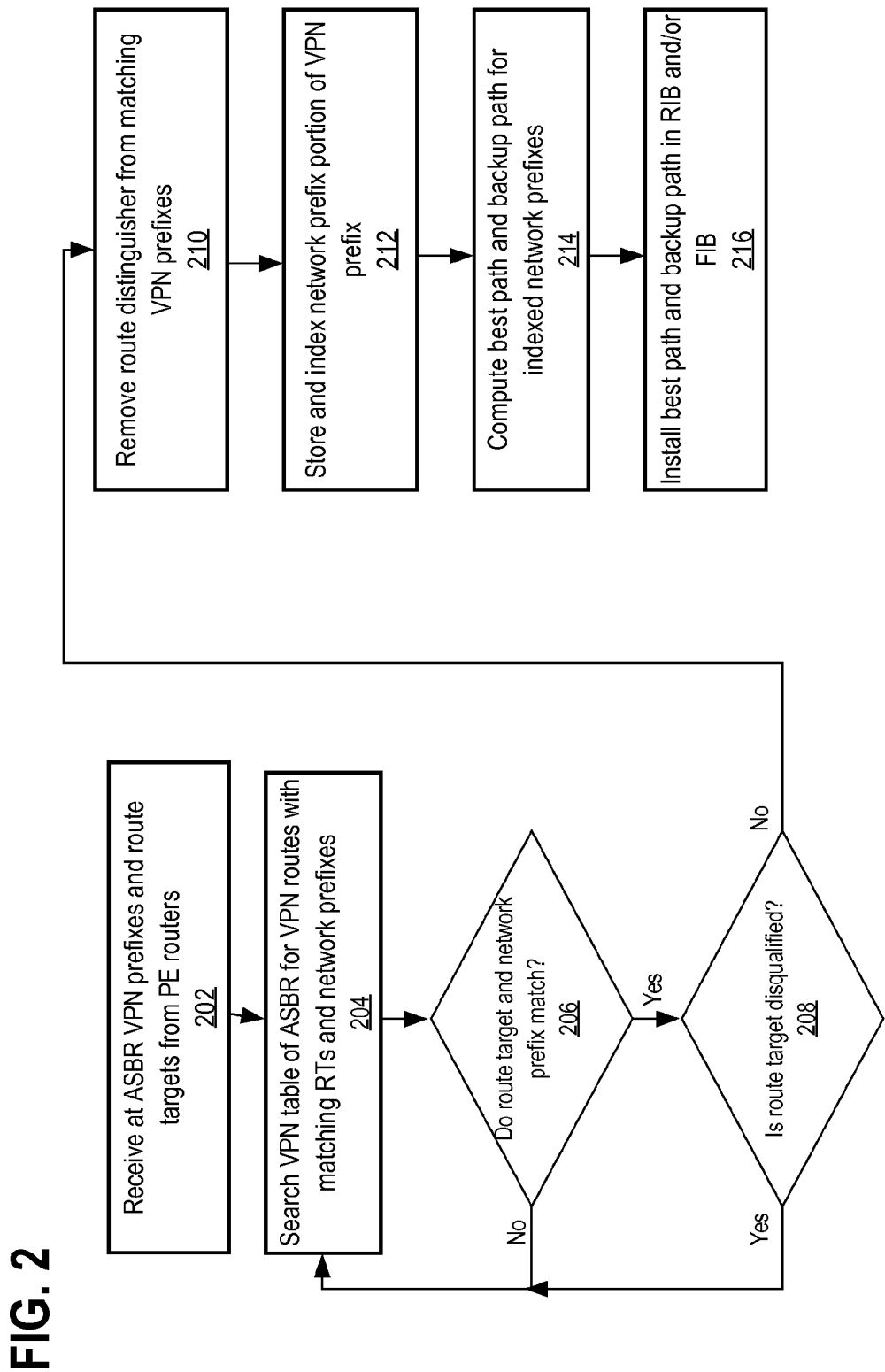
FIG. 2 illustrates an approach for detecting and computing paths to multihomed VPN sites in accordance with an embodiment.

FIG. 2 illustrates an approach for detecting and computing paths to multihomed VPN sites in accordance with an embodiment. According to one embodiment, the techniques in FIG. 2 are implemented using one or more special-purpose computing devices that may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Alternatively, FIG. 2 may be implemented using program instructions for a general-purpose router or other computing device which, when loaded from one or more non-transitory data storage media storing the instructions, cause the router or other computing device to execute the instructions to perform the processes described herein. In some embodiments loading and executing the instructions in this manner transforms a general-purpose router or other computing device into a special-purpose computing device that is configured to perform the techniques herein.

In block 202, the ASBR receives VPN prefixes and route targets from one or more PE routers. In an embodiment, the VPN prefixes comprise an RD part and a network prefix part. The RD part may include any value assigned by the PE router to distinguish the route from other routes that share the same network prefix. An example RD includes without limitation a numerical or string value of a fixed or variable number of bytes that is appended to the network prefix. The network prefix may include without limitation an IPv4 or IPv6 prefix.

In an embodiment, the ASBR stores the RTs and VPN prefixes that it receives in a VPN table. In block 204, the ASBR searches the VPN table for routes that have matching RTs and network prefixes. The manner in which the search is performed may vary depending on the implementation. For example, the search may be performed on-demand, on a periodic basis, in response to a predefined event, such as receiving a BGP UPDATE message, or in any other suitable manner. In an example embodiment, the search process may first find a set of matching RTs in the VPN table. Once a set of matching RTs is found, the ASBR determines a set of VPN routes associated with the matching RTs and compares their VPN prefixes. When comparing the VPN prefixes, the search process may ignore or remove the RD portion of the VPN prefix to determine which of the set of VPN routes have the same network prefix. In an embodiment, the VPN table of the ASBR does not include duplicate VPN prefixes. Therefore, the set of VPN routes that share matching RTs and network prefixes will each have a different RD. Alternatively, the search process may discard routes with matching RDs.

In block 206, the ASBR determines based on the search in block 204 whether an RT and network prefix associated with a particular VPN route matches the RT and network prefix for any other VPN routes. If there are no matches, then the process returns to block 204. If the ASBR finds VPN routes that share matching RTs and network prefixes, then the process continues to block 208.

In some instances, a network operator may not want certain RTs to be matched. For example, certain sites and/or network devices may be configured with an RT and network prefix for purposes of monitoring or management. To avoid installing a backup path to such sites, the ASBR may store data that identifies a set of disqualified RTs that should not be matched. If such a list is maintained by the ASBR, then in block 208, the ASBR determines whether either of the matching RTs is disqualified. If an RT that was matched at block 206 is disqualified, then the process returns to block 204. If matching RTs are not disqualified, then the process continues to block 208. If there are no disqualified RTs, then block 208 may be omitted. In alternative embodiments, block 208 may be performed before block 206 or may be integrated into block 204 to prevent searching for disqualified RTs.

In block 210, the ASBR processes the VPN prefixes matched at block 206 to separate the RD part of each VPN prefix from the network prefix part. Alternatively, the RD may be removed during the search process at block 204. Removing the RD part enables the ASBR to identify the network prefixes with multiple paths, also referred to herein as a multihomed prefix.

After the RD part and the network prefix part have been separated, the ASBR stores and indexes the network prefix in block 212. Block 212 may comprise storing the network prefix into a separate the VRF table. In an embodiment, the VRF table is unique per each VPN instance. For example, the ASBR may maintain a separate VRF table for each RT that identifies a multihomed VPN site. In another embodiment, the ASBR may index the VRF tables based on the set of RDs that belong to the VPN instance or based on some other VRF identifier to which the set of RDs map.

In block 214, the ASBR computes a primary path and a backup path for the indexed network prefixes. Any suitable mechanism for computing and selecting the primary path and the backup path may be used and may vary from implementation to implementation. For example, the ASBR may identify VPN prefixes, MPLS labels, and/or other VPN route information associated with a path for installation in a routing table. When selecting between different paths, the ASBR may randomly select the primary path and the backup path(s). Alternatively, the ASBR may implement a best-path selection algorithm to select the primary path and the backup path. For example, the ASBR may select the path with the lowest IGP metric to the BGP next hop as the primary path. In other examples, the ASBR may select the oldest route that was received by the ASBR, the route that comes from a BGP route with the lowest ID, or the route that comes from the lowest neighbor address as a primary path. If there are more than two paths, than a single or multiple backup paths may be installed. The additional backup paths may be selected randomly or as determined by the best-path selection algorithm.

In block 216, the ASBR installs the primary path and backup path computed at block 214 in an RIB and/or FIB. Once installed, the ASBR uses the RIB and/or FIB to determine how to route packets to the multihomed site. For example, in response to ASBR1 118 receiving a network packet from ASBR2 128 with a destination of VPN Site 102, ASBR1 118 may forward the packet along the path from RR1 116 to PE1 112 to CE1 104 if the RIB or FIB indicates that this path is the primary path. If the primary path has failed or is otherwise unavailable, ASBR1 may forward the packet along the path from RR1 116 to PE2 114 to CE1 104 if the RIB or FIB indicates that this path is the backup path. If the primary path is repaired, ASBR1 118 may revert to using the primary path or may continue to use the backup path until the backup path fails.

The process illustrated in FIG. 2 may also be implemented for VPN route information received from ASBRs in other ASes. For example, ASBR1 118 and ASBR2 128 may exchange VPN route information using EBGP. Accordingly, block 202 would comprise the ASBR receiving VPN prefixes and RTs from another ASBR. Block 204 to 216 may then be implemented to detect multihomed sites in other ASes.

The process illustrated in FIG. 2 may be implemented independently on an ASBR. Therefore, one ASBR within an AS may be configured to detect multihomed prefixes according to the techniques described herein, while another ASBR within the same AS may or may not be configured with such logic. Furthermore, the process illustrated in FIG. 2 may be implemented without requiring any updates to PE routers or extensions to protocols for exchanging VPN route information.

3.1 Fully-Automated Approach

The detection of multihomed prefixes, as described above, may be fully automated on the ASBR. In an example embodiment, each PE router is configured to associate all routes that lead to a specified site with a particular RT. When the ASBR determines whether RTs match in block 204, the ASBR may perform a direct data comparison of each RT. In contrast to the semi-automated approach, described in further detail below, the ASBR does not need to maintain mapping data for the various RTs.

Figure 3A:
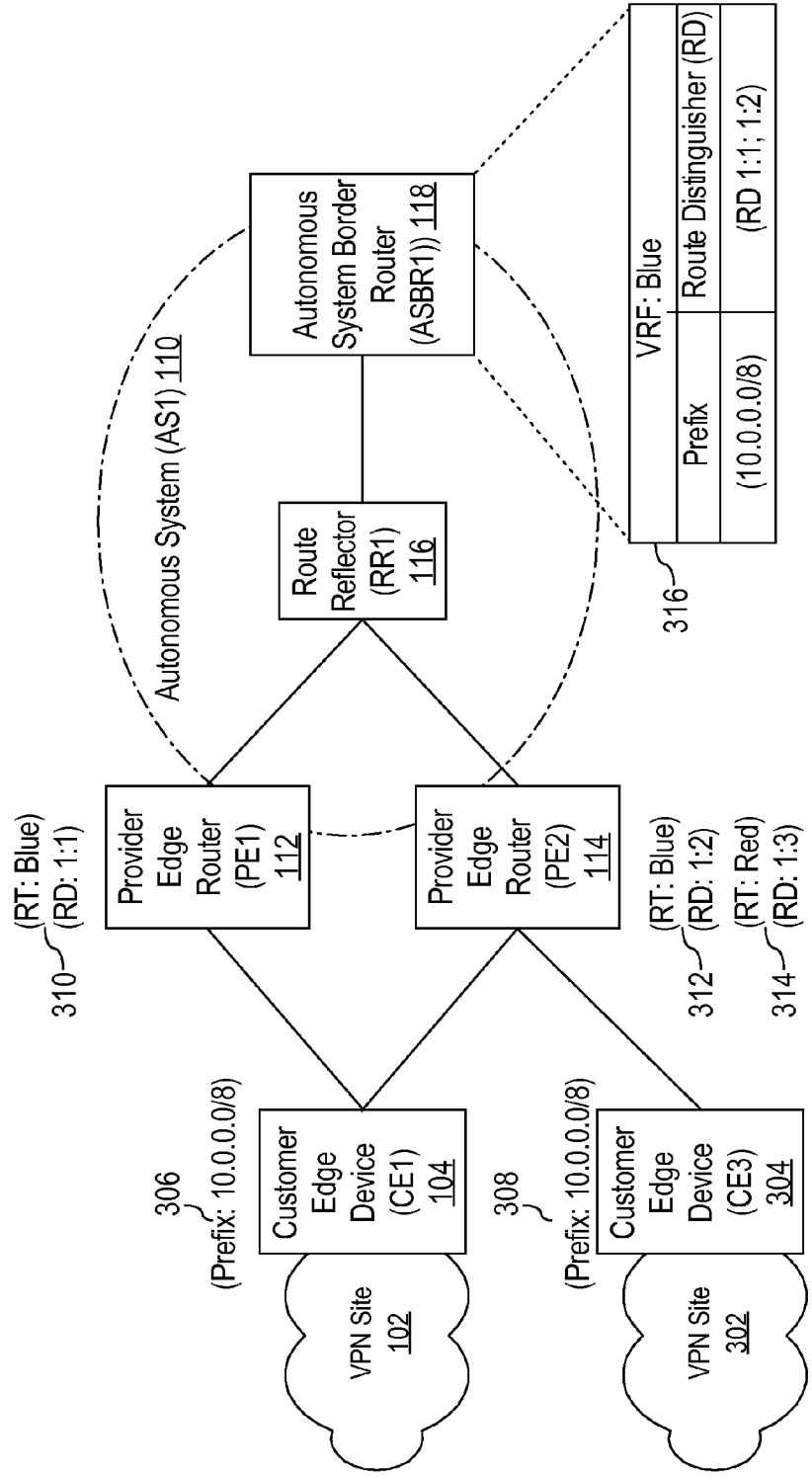
FIG. 3A illustrates an example implementation of a fully-automated approach to detect multihomed VPN sites in accordance with an embodiment.

FIG. 3A illustrates an example implementation of a fully-automated approach to detect multihomed VPN sites in accordance with an embodiment. Referring to FIG. 3A, VPN site 102 includes CE1 104, which is peered with both PE1 112 and PE2 114. VPN site 302 includes CE2 304, which is peered with PE2 114. VPN site 102 and VPN site 302 share overlapping address space. Specifically, both CE1 and CE2 advertise prefix 306 and CE2 advertises prefix 308, which share the same network prefix: 10.0.0.0/8.

PE1 112 and PE2 114 receive prefix 306 from CE1 and associate an RT and an RD with the prefix. For example, PE1 112 may assign VPN route information 310, which includes RT "Blue" and RD "1:1". PE2 114 is configured to assign VPN information 312, which includes the same RT assigned by PE1, but a different RD for distinguishing the routes through PE1 112 and PE2 114. For prefix 308, PE2 114 associates VPN information 314, which includes RT "Red" and RD "1:3". Even though prefix 306 and prefix 308 are the same, PE2 114 assigns a different RT to prefix 306 and prefix 308 because the prefixes originated from different VPN sites.

PE1 112 and PE2 114 send the VPN route information to ASBR1 118 via RR1 116. The ASBR1 118 may store the VPN route information in a VPN table and implement the process illustrated in FIG. 2 to detect prefixes to multihomed VPN sites. Specifically, ASBR1 searches the VPN route table to determine that there are two VPN routes with the identical "Blue" RTs. ASBR1 118 then determines that the VPN routes associated with these matching RTs also share the same "10.0.0.0/8" network prefix. ASBR1 118 identifies this prefix as a multihomed prefix and generates VRF table 316. VRF table 316 maps the multihomed prefix to the RDs and/or the RDs to the multihomed prefix. The RD 1.3 included with VPN route information 314 is not included or otherwise associated with the VRF table because the "Red" RT does not match the "Blue" RT.

Once ASBR1 118 has identified the multihomed prefix, ASBR1 118 may compute and install paths to the multihomed site, as described above with respect to blocks 214 and 216. For example, the primary path from ASBR1 118 to VPN site 102 may traverse PE1 112 and the backup path may traverse PE2 114. In the event that the primary path fails, ASBR1 may forward VPN packets to VPN site 102 via the backup path.

3.2 Semi-Automated Approach

In some instances, network operators may configure PE routers such that different PE routers assign different RTs to the same VPN site. Therefore, the direct comparison of RTs may be insufficient to accurately detect which prefixes belong to multihomed sites. As an alternative or in addition to the fully automated approach, the ASBR may be configured with mapping data that maps RTs to a VPN site identifier. For example, a network operator may configure a list of RTs which are known to be used for multihomed sites. The ASBR would use the list during the search process of block 204 to match RTs and network prefixes.

Figure 3B:
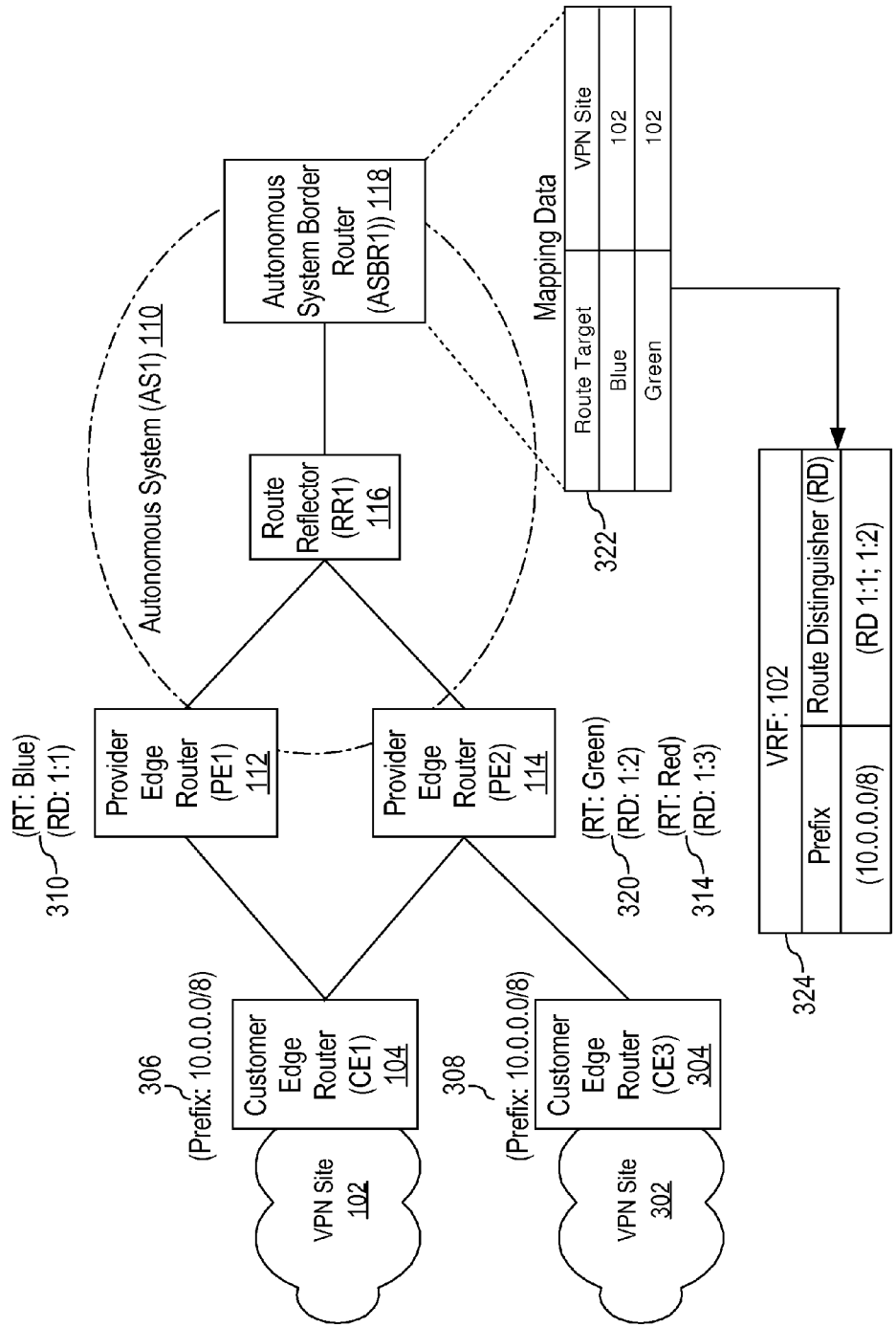
FIG. 3B illustrates an example implementation of a semi-automated approach to detect multihomed VPN sites in accordance with an embodiment.

FIG. 3B illustrates an example implementation of a semi-automated approach to detect multihomed VPN sites in accordance with an embodiment. In contrast to the implementation depicted in FIG. 3A, PE2 114 associates VPN route information 320 with prefix 306. Accordingly, PE1 112 and PE2 114 assign different RTs to prefix 306, even though the same VPN site originated the advertisement.

In order to accurately match RTs, ASBR1 118 maintains mapping data 322, which maps RTs to a common identifier for multihomed VPN sites. The identifier may comprise any data that identifies a particular VPN site. For example, the identifier may be represented by a unique alphanumeric string, containing letters, digits and/or special characters. In the example implementation of FIG. 3B, RTs "Blue" and "Green" both map to "102". RT "Red" is not included in mapping data 322 because VPN site 302 is not a multihomed site. ASBR1 118 uses mapping data 322 to determine that "Blue" and "Green" are matching RTs since they map to the same identifier. "Red" does not match either "Blue" or "Green" because it is not included in mapping data 322. In an alternative embodiment, mapping data 322 may include data that maps "Red" to a site identifier for VPN site 302. ASBR1 118 may then determine that "Red" does not match "Blue" or "Green" because it maps to a different site identifier.

Once ASBR1 118 finds the matching RTs, ASBR1 118 may compare VPN prefixes to determine which VPN routes share the same network prefix. ASBR1 118 then generates VRF 324, which includes data identifying multihomed prefix 306. ASBR1 118 uses the information in VRF 324 to compute and install paths to VPN site 102, as described above with respect to blocks 214 and 216.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
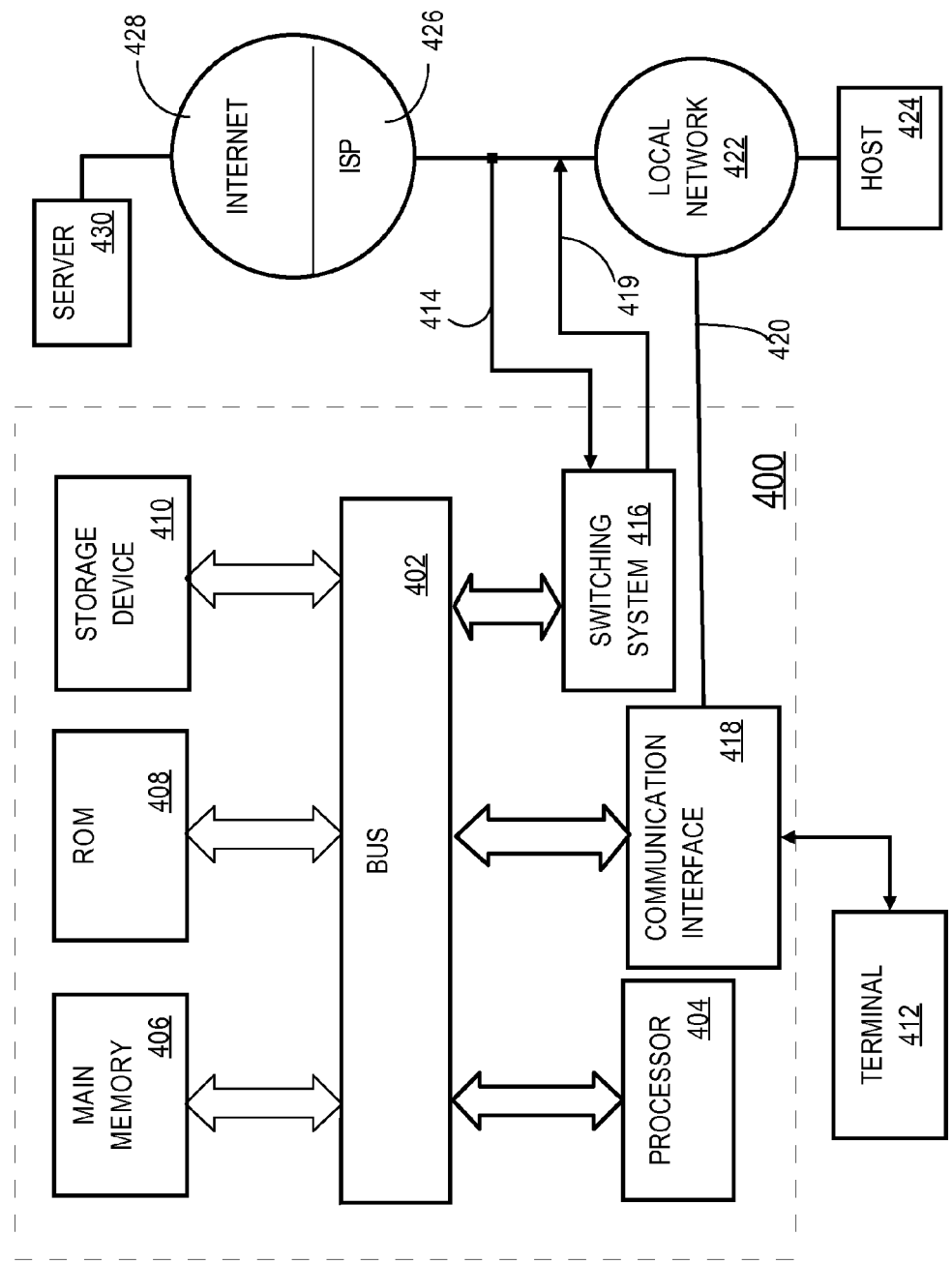
FIG. 4 illustrates a computer system upon which an embodiment may be implemented.

FIG. 4 is a block diagram that illustrates a computer system 400 upon which an embodiment may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 418. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

An embodiment is related to the use of computer system 400 for detecting prefixes for multihomed sites and computing backup paths. According to one embodiment, the techniques described herein are provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other tangible storage medium from which a computer can read.

Various forms of computer readable storage media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with an embodiment, one such downloaded application provides for fast convergence as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving, at an Autonomous System Border Router (ASBR), first Virtual Private Network (VPN) route information including a first route target assigned by a first routing device for a particular VPN site, a first route distinguisher assigned by the first routing device for a first route to the particular VPN site, and a first network prefix associated with the particular VPN site;
   receiving, at the ASBR, second VPN route information including a second route target assigned by a second routing device for the particular VPN site, a second route distinguisher assigned by the second routing device for a second route to the particular VPN site, and a second network prefix associated with the particular VPN site, wherein the second route distinguisher is different than the first route distinguisher and the second routing device is different than the first routing device;
   using the ASBR, comparing the first route target to the second route target, the first route distinguisher to the second route distinguisher, and the first network prefix to the second network prefix; and
   in response to determining that the first route target and the second route target are for the same particular VPN site, that the first route distinguisher and the second route distinguisher are different, and that the first network prefix matches the second network prefix, associating in a routing table of the ASBR the particular VPN site with a first path based on the first VPN route information and a second path based on the second VPN route information.

2. The method of claim 1, wherein associating comprises computing a primary path and a backup path to the particular VPN site; wherein the first routing device is a first provider edge (PE) router and the primary path traverses the first PE router associated with the first VPN route information; wherein the second routing device is a second PE router and the backup path traverses the second PE router associated with the second VPN route information; installing the primary path and the backup path in the routing table of the ASBR.

3. The method of claim 2, further comprising: receiving a first network packet at the ASBR; wherein the particular VPN site is a first destination associated with the first network packet; in response to receiving the first network packet, forwarding the first network packet along the primary path; receiving a second network packet at the ASBR; wherein the particular VPN site is a second destination associated with the second network packet; detecting a failure along the primary path; in response to detecting the failure along the primary path, forwarding the second packet along the backup path.

4. The method of claim 1, wherein the ASBR stores mapping data that maps route targets to site identifiers and wherein comparing comprises: searching the mapping data using the first route target to find a first site identifier associated with the first route target; searching the mapping data using the second route target to find a second site identifier associated with the second route target; and determining whether the first site identifier associated with the first route target and the second site identifier associated with the second route target are the same.

5. The method of claim 1, further comprising: in response to determining that the first route target does not match the second route target or the first network prefix does not match the second network prefix, determining that the first path and the second path are not associated as a primary path and a backup path.

6. The method of claim 1, wherein the routing table is at least one of a Routing Information Base (RIB) or a Forwarding Information Base (FIB).

7. The method of claim 1, wherein the ASBR stores a list of disqualified route targets, the method further comprising: comparing the first route target and the second route target to the list of disqualified route targets; in response to determining that the first route target or the second route target is included on the list of disqualified route targets, determining that the first path and the second path are not associated as a primary path and a backup path.

8. One or more non-transitory computer-readable storage media comprising one or more sequences of instructions which when executed cause one or more processors to perform:
   receiving, at an Autonomous System Border Router (ASBR), first Virtual Private Network (VPN) route information including a first route target assigned by a first routing device for a particular VPN site, a first route distinguisher assigned by the first routing device for a first route to the particular VPN site, and a first network prefix associated with the particular VPN site;
   receiving, at the ASBR, second VPN route information including a second route target assigned by a second routing device for the particular VPN site, a second route distinguisher assigned by the second routing device for a second route to the particular VPN site, and a second network prefix associated with the particular VPN site, wherein the second route distinguisher is different than the first route distinguisher and the second routing device is different than the first routing device;
   using the ASBR, comparing the first route target to the second route target, the first route distinguisher to the second route distinguisher, and the first network prefix to the second network prefix; and
   in response to determining that the first route target and the second route target are for the same particular VPN site, that the first route distinguisher and the second route distinguisher are different, and that the first network prefix matches the second network prefix, associating in a routing table of the ASBR the particular VPN site with a first path based on the first VPN route information and a second path based on the second VPN route information.

9. The one or more non-transitory computer-readable storage media of claim 8, wherein instructions for associating comprise instructions for: computing a primary path and a backup path to the particular VPN site; wherein the first routing device is a first provider edge (PE) router and the primary path traverses the first PE router associated with the first VPN route information; wherein the second routing device is a second PE router and the backup path traverses the second PE router associated with the second VPN route information; installing the primary path and the backup path in the routing table of the ASBR.

10. The one or more non-transitory computer-readable storage media of claim 9, wherein the instructions, when executed, further cause: receiving a first network packet at the ASBR; wherein the particular VPN site is a first destination associated with the first network packet; in response to receiving the first network packet, forwarding the first network packet along the primary path; receiving a second network packet at the ASBR; wherein the particular VPN site is a second destination associated with the second network packet; detecting a failure along the primary path; in response to detecting the failure along the primary path, forwarding the second packet along the backup path.

11. The one or more non-transitory computer-readable storage media of claim 8, wherein the ASBR stores mapping data that maps route targets to site identifiers and wherein instructions for comparing comprise instructions for: searching the mapping data using the first route target to find a first site identifier associated with the first route target; searching the mapping data using the second route target to find a second site identifier associated with the second route target; and determining whether the first site identifier associated with the first route target and the second site identifier associated with the second route target are the same.

12. The one or more non-transitory computer-readable storage media of claim 8, wherein the instructions, when executed, further cause: in response to determining that the first route target does not match the second route target or the first network prefix does not match the second network prefix, determining that the first path and the second path are not associated as a primary path and a backup path.

13. The one or more non-transitory computer-readable storage media of claim 8, wherein the routing table is at least one of a Routing Information Base (RIB) or a Forwarding Information Base (FIB).

14. The one or more non-transitory computer-readable storage media of claim 8, wherein the ASBR stores a list of disqualified route targets, wherein the instructions, when executed, further cause comparing the first route target and the second route target to the list of disqualified route targets; in response to determining that the first route target or the second route target is included on the list of disqualified route targets, determining that the first path and the second path are not associated as a primary path and a backup path.

15. An apparatus comprising:
one or more digital electronic central processing units (CPUs);
a communications interface coupled to the one or more CPUs and configured to:
connect a first autonomous system to a second autonomous system;
receive first Virtual Private Network (VPN) route information including a first route target assigned by a first routing device for a particular VPN site, a first route distinguisher assigned by the first routing device for a first route to the particular VPN site, and a first network prefix associated with the particular VPN site;
receive second VPN route information including a second route target assigned by a second routing device for the particular VPN site, a second route distinguisher assigned by the second routing device for a second route to the particular VPN site, and a second network prefix associated with the particular VPN site, wherein the second route distinguisher is different than the first route distinguisher and the second routing device is different than the first routing device;
electronic digital memory coupled to the one or more CPUs and comprising a routing table configured to store routing information identifying paths within the first autonomous system;
logic coupled to the one or more CPUs and configured to:
compare the first route target to the second route target, the first route distinguisher to the second route distinguisher, and the first network prefix to the second network prefix;
in response to determining that the first route target and the second route target are for the same particular VPN site, that the first route distinguisher and the second route distinguisher are different, and that the first network prefix matches the second network prefix, associating in the routing table the particular VPN site with a first path based on the first VPN route information and a second path based on the second VPN route information.

16. The apparatus of claim 15, wherein the logic for associating comprises logic for: computing a primary path and a backup path to the particular VPN site; wherein the first routing device is a first provider edge (PE) router and the primary path traverses the first PE router associated with the first VPN route information; wherein the second routing device is a second PE router and the backup path traverses the second PE router associated with the second VPN route information; installing the primary path and the backup path in the routing table.

17. The apparatus of claim 16, wherein the logic is further configured to: detect a failure along the primary path and wherein the communications interface is further configured to: receive a first network packet; wherein the particular VPN site is a first destination associated with the first network packet; in response to receiving the first network packet, forward the first network packet along the primary path; receive a second network packet; wherein the particular VPN site is a second destination associated with the second network packet; in response to the detected failure along the primary path, forward the second packet along the backup path.

18. The apparatus of claim 15, further comprising mapping data that maps route targets to site identifiers and wherein logic for comparing comprise logic for: searching the mapping data using the first route target to find a first site identifier associated with the first route target; searching the mapping data using the second route target to find a second site identifier associated with the second route target; and determining whether the first site identifier associated with the first route target and the second site identifier associated with the second route target are the same.

19. The apparatus of claim 15, wherein the logic is further configured to: in response to determining that the first route target does not match the second route target or the first network prefix does not match the second network prefix, determine that the first path and the second path are not associated as a primary path and a backup path.

20. The apparatus of claim 15, wherein the routing table is at least one of a Routing Information Base (RIB) or a Forwarding Information Base (FIB).

\* \* \* \* \*